United States Patent [19]

Abbott et al.

[11] 4,428,722

[45] Jan. 31, 1984

[54] PIPE BELLING APPARATUS

[76] Inventors: Bruce A. Abbott, Rte. 2, Box 29, Henderson, Ky. 42420; John M. Cohen, 6500 Newburgh Rd., Evansville, Ind. 47715

[21] Appl. No.: 275,989

[22] Filed: Jun. 22, 1981

[51] Int. Cl.³ .................... B29C 17/00; B29D 23/00
[52] U.S. Cl. .................................. 425/150; 425/393; 425/DIG. 218
[58] Field of Search ...... 425/150, 393, 388, DIG. 218

[56] References Cited

U.S. PATENT DOCUMENTS

| 3,205,535 | 9/1965 | Niessner et al. | 425/393 X |
| 3,910,744 | 10/1975 | Ronden et al. | 425/393 X |
| 4,134,949 | 1/1979 | McGregor | 425/388 X |
| 4,218,208 | 8/1980 | Hayes et al. | 425/393 X |
| 4,266,926 | 5/1981 | Gordon | 425/393 X |
| 4,277,231 | 7/1981 | Gordon | 425/393 X |

Primary Examiner—J. Howard Flint, Jr.

[57] ABSTRACT

Apparatus for automatically forming a bell-shaped socket on an end of thermoplastic pipe or the like. The apparatus includes a stripper plate separate from the belling mandrel, and positioned to be engaged and carried by the mandrel during a belling operation. The stripper plate carries a switch which is engaged by the end of the pipe when a predetermined bell depth is attained by the mandrel. Automatic control circuitry is disclosed to initiate a cooling water spray, to retract the mandrel, and to signal the absence of a good bell.

11 Claims, 3 Drawing Figures

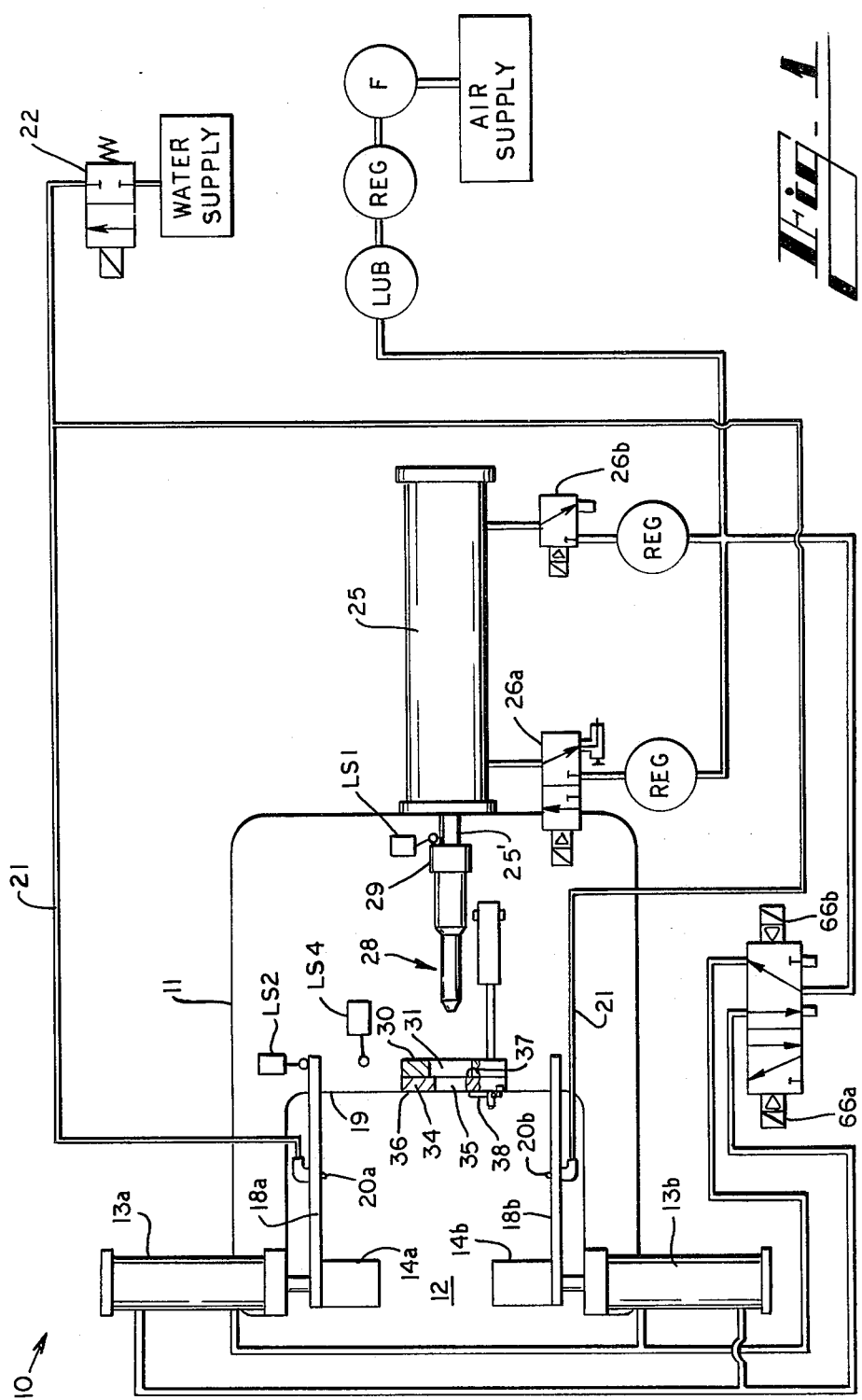

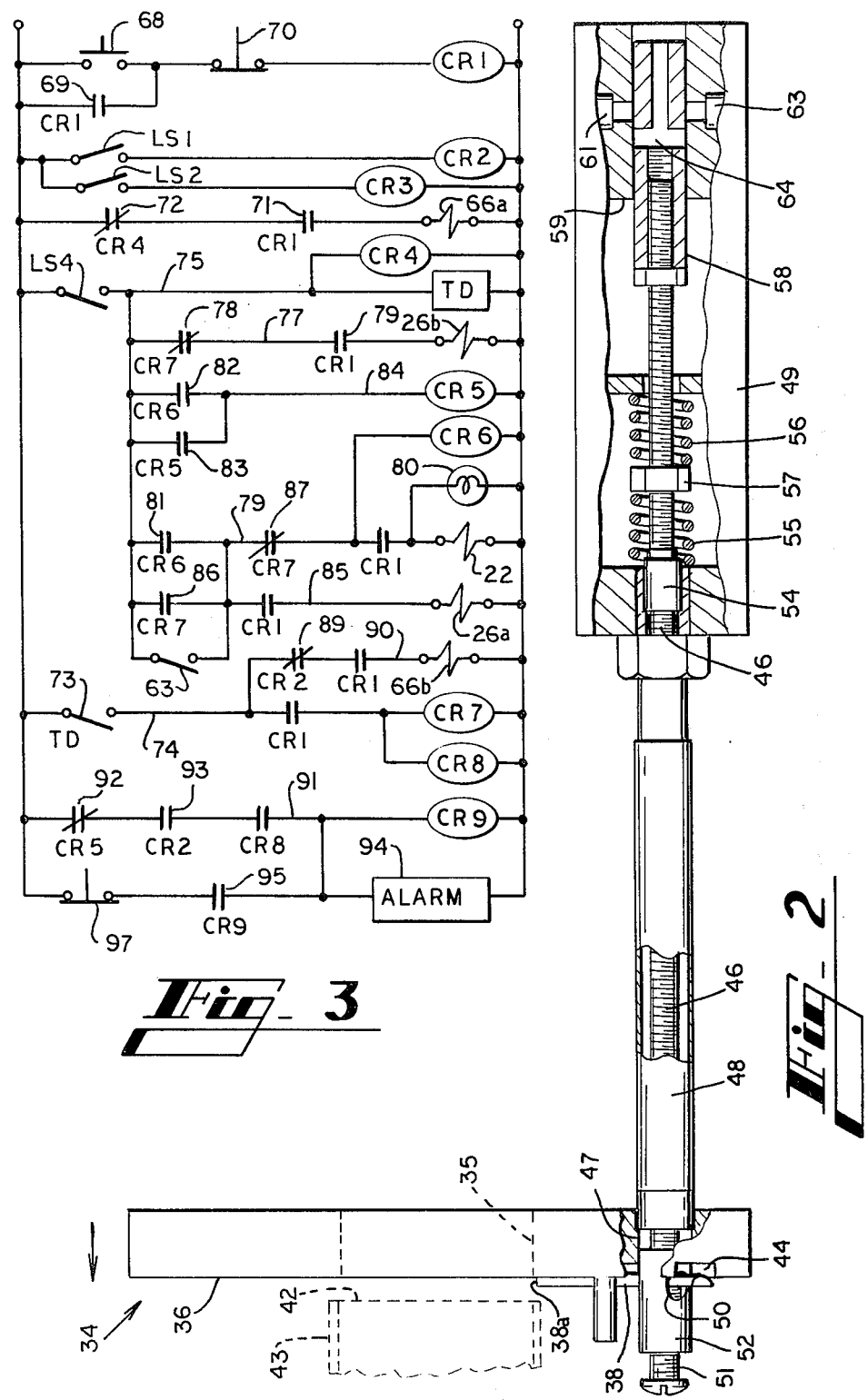

PIPE BELLING APPARATUS

FIELD OF THE INVENTION

This invention relates in general to apparatus for forming a bell-shaped socket on an end of thermoplastic pipe, and relates in particular to apparatus for automatically and more accurately belling the end of a pipe.

BACKGROUND OF THE INVENTION

One convenient way to join lengths of pipe end-to-end is to form a bell-shaped socket on one end of each piece of pipe. The normal or unbelled end of each piece slips into the socket formed by the belled end of an adjacent piece, thereby providing a convenient manner of forming a pipeline in the field.

Thermoplastic pipe is extruded continuously and cut into predetermined lengths while traveling from the extrusion apparatus. The desired time for forming a socket or bell at one end of each pipe length is at the end of the extrusion line, where the newly-formed pipe is still hot. Pipe belling is conventionally accomplished by inserting a mandrel into the end of the pipe to form the bell, and additional heating may be required to bring the pipe end to a suitable forming temperature. Once the mandrel is inserted, the pipe is cooled to reduce its plasticity and finally the mandrel is removed.

Various machines have been built or proposed to perform the foregoing bell forming operations. The bell or socket to be formed is tapered to provide the desired end-to-end fit with an adjoining length of pipe, and to meet standard requirements the bell must be held to close tolerances on the entrance and bottom dimensions. These tolerances require accurate and controlled depth penetration of the mandrel into the pipe end being belled.

Various techniques for controlling the depth of the pipe bell or socket have been proposed in the art, with less than satisfactory results. Some methods have assumed that the pipe being belled is the same length each time, which in practice can vary. Other depth controlling techniques call for positioning the end of the pipe at a predetermined point, and then gripping the pipe while the mandrel is moved forwardly a certain distance relative to the predetermined point. This technique does not allow for pipe slippage in the gripping device during the belling operation, or for mispositioning of the previously-aligned pipe by the gripping device itself.

SUMMARY OF INVENTION

Accordingly, it is an object of the present invention to provide improved pipe belling apparatus.

It is another object of the present invention to provide pipe belling apparatus capable of forming more accurately and repeatably a belled end of predetermined depth.

It is yet another object of the present invention to provide improved pipe belling apparatus forming sockets of consistent depth without requiring precisely prepositioned lengths of pipe.

It is yet another object of the present invention to provide an improved automatic pipe belling machine.

Other objects and advantages of the present invention will become apparent from the following description.

Stated somewhat generally, the objects of the present invention are accomplished by a pipe sensing arrangement which senses the end of the pipe being belled and stops the mandrel travel at the precise predetermined depth from the end of the pipe. The apparatus also senses the absence of a piece of pipe, and tells if a pipe is present but for some reason is not belled to the correct depth.

Stated somewhat more specifically, pipe belling apparatus according to the present invention includes a pipe sensing means positioned apart from the mandrel, so as to be engaged during forward belling movement of the mandrel and carried along with the mandrel until the pipe end is sensed. Forward movement of the mandrel then terminates, and the mandrel is thereafter retracted. The belled pipe and the sensing means are retracted along with the mandrel until the sensing means contacts a stop member. The mandrel itself continues to retract beyond the stop member, effectively stripping the belled pipe from the mandrel.

Stated in somewhat greater detail, the sensing means is carried by a stripper plate which is engaged to travel forwardly with the mandrel. The stripper plate carries a switch element, and the switch element is connected to a switching assembly mounted behind the stripper plate. The mandrel and stripper plate move forwardly until the mandrel is a predetermined depth within the pipe, at which time the pipe end contacts the switch element. The stripper plate is subsequently retracted along with the mandrel until the stripper plate contacts a stop member, so that the stripper plate and the pipe remain stationary while the mandrel withdraws from the pipe and retracts a further distance.

BRIEF DESCRIPTION OF DRAWING

FIG. 1 is a pictorial partly-schematic view showing apparatus according to a preferred embodiment of the present invention.

FIG. 2 is a partially-sectioned assembly view showing details of the stripper plate and associated switch apparatus of the disclosed embodiment.

FIG. 3 shows an electrical schematic diagram for the sensing and control apparatus of the disclosed embodiment.

DESCRIPTION OF PREFERRED EMBODIMENT

Turning first to FIG. 1, there is shown generally at 10 an embodiment of pipe belling apparatus according to the present invention. It will be seen that the apparatus disclosed and described herein pertains to the improved belling apparatus, and those skilled in the art will realize that the typical manufacturing facility for extruded thermoplastic pipe includes an extrusion line, pipe handling equipment, and other elements forming no part of the present invention.

The apparatus 10 includes a frame 11 defining an open throat region 12 into which a pipe (not shown) is placed for belling. A pair of clamping cylinders 13a and 13b are supported by the frame 11 in opposed spaced-apart relation across the open end of the throat 12. Attached to the piston rod of each clamping cylinder 13a and 13b is a mold block 14a and 14b, and it should be understood that each mold block forms half of a clamp to secure the pipe near the end being belled. Also attached to and movable with the operating rod of the clamping cylinder 13a is the arm 18a, which extends inwardly toward the closed inner end 19 of the throat 12. A limit switch LS2 is mounted on the frame 11 in position to be actuated by the arm 18a in its outermost or retracted position, shown in FIG. 1, and the purpose of this limit switch is described below. Separate water jet nozzles 20a and 20b are supported by the corresponding arms 18a and 18b, in position to direct jets of cooling water toward a belled pipe within the throat 12. The nozzles 20 are connected by lines 21 and the solenoid valve 22 to a suitable water supply.

Mounted to one side of the frame 11 is the mandrel actuating cylinder 25. This cylinder has an operating rod 25' pneumatically powered to extend or to retract in response to operation of the solenoid air valves 26a and 26b.

Connected to the outer end of the cylinder operating rod 25' is the conventional belling mandrel indicated generally at 28, and it will be understood that the dimensions of this mandrel (including taper and length) are selected to provide the appropriate bell-shaped socket in the tubing being belled. The mandrel 28, at its point of interconnection with the operating rod 25', has a shoulder 29 of enlarged diameter relative to the bell-forming portions of the mandrel located forwardly of the shoulder. This shoulder in its retracted position engages limit switch LS1.

Positioned to the left of the mandrel 28, in line with the path of forward travel for the mandrel when the operating rod 25' is extended from the cylinder 25, is the stripper mounting plate 30. This mounting plate 30 is securely attached to the frame 11 of the pipe belling machine, and includes an opening 31 coaxially aligned with the travel path of the mandrel 28. The opening 31 in the mounting plate is sized to permit the mandrel, including the enlarged shoulder 29, to pass without interference through the hole 31 as the cylinder operating rod 25' is advanced and retracted.

A stripper plate 34 is located to the immediate left of the stripper mounting plate 30, as viewed in FIG. 1, so that the outer surface 36 of the stripper plate faces the open throat 12. An opening 35 is formed in the stripper plate 34, coaxial with the opening 31 in the mounting plate 30 and with the path of travel for the mandrel 28. The opening 35 in the stripper plate 34 is sized to permit free passage of the mandrel 28, except for the enlarged shoulder 29 of the mandrel. When the mandrel is advanced toward the throat 12 of the frame 11, it will thus be seen that the shoulder 29 passes through the opening 31 in the mounting plate 30 and abuts against the ledge 37 surrounding the smaller-diameter opening 35 in the stripper plate 34.

The stripper plate 34, unlike the mounting plate 30 which is secured to the frame 11 of the belling machine, is removably received on the frame and free to travel leftwardly into the open throat 12 with the mandrel 28, as the mandrel continues its extension through the opening 31 in the mounting plate. The stripper plate 34 thus is carried by the mandrel 28 outwardly from the mounting plate 30, as the mandrel enters and bells a length of pipe clamped in the mold blocks 14a, 14b, until the pipe end engages the switch finger 38 on the surface 36 of the stripper plate.

Turning to FIG. 2, the switch finger 38 and its associated operating apparatus are shown in greater detail. The stripper plate 34 is depicted in FIG. 2 as traveling leftwardly with the mandrel, just short of encountering the end 42 of the belled pipe 43 shown in broken line. The mandrel 28 is omitted from FIG. 2 for clarity, although it should now be apparent that the mandrel at this point extends through the opening 35 in the stripper plate 34, and has entered and belled the pipe 43.

The switch finger 38 comprises an elongate member having an outer end 38a lying just outside the opening 35 in the stripper plate 34. It can be seen from FIG. 2 that the outer end 38a of the switch finger 38 is positioned to be impinged by the end 42 of the pipe 43 being belled, as the stripper plate continues moving forwardly.

The switch finger 38 is mounted for movement relative to the stripper plate 34 by being affixed to the switch rod 46, which extends through an opening 47 at one side of the mandrel opening 35 in the stripper plate. The switch rod 46 is reciprocably contained within the switch pipe 48, which is affixed to the stripper plate 34 and extends rearwardly therefrom to terminate in the switch bracket 49. The switch rod 46 extends into the opening 47 in the stripper plate 34, and the switch finger 38 is received through a transverse opening 50 in the switch rod extension 52 attached to the switch rod. A set screw 51 is threaded into the open end of the extension 52 to secure the switch finger 38 in place. The extension 52 fits in a counterbore of the opening 47 for reciprocable movement with the switch rod 46.

Underlying the switch finger 38 is a recess 44 formed in the outer surface 36 of the stripper plate 34. The recess 44 is sufficiently deep to receive the switch finger 38 when the stripper plate 34 (and the outer end 38a of the switch finger) contact the end 42 of the pipe 43 being belled.

The switch rod 46 is supported within the switch pipe 48 by bushings including the bushing 54, so that the switch rod can move back and forth within the switch pipe. The switch rod 46 is normally maintained in a centered position by the two balancing springs 55 and 56, carried on the switch bracket 49 between opposite sides of an abutment 57 secured to the switch rod. The switch rod extends to the right of the balancing springs and terminates in the bushing 58, which is secured to the switch rod and is slidably received within the housing 59 at the outer end of the switch bracket 49.

A photoswitch light source 61 and a photoswitch sensor 63 are mounted within openings formed in the housing 59, on opposite sides of the bushing 58 slidably mounted therewithin. A transverse slot 64 is formed in the bushing 58, in position to be misaligned with the light source 61 and sensor 63 when the switch rod 46 is maintained in normal position by the balancing springs 55 and 56. Whenever the switch rod 46 is moved to the right, as by the switch finger 38 contacting the end 42 of pipe 43, the bushing 58 moves rightwardly to align the transverse slot 64 with the light source 61 and the sensor 63. This alignment takes place as the switch finger 38 senses the end 42 of the pipe being belled, and the sensor 63 thus provides a signal used to stop further forward extension of the mandrel 28 by the cylinder 25.

Operation of the mechanical system as described above is now described, with a description of the electrical operation to follow. When a length of pipe is positioned between the mold blocks 14a and 14b, the solenoid valve 66a is operated to cause the clamping cylinders 13a and 13b to engage the pipe. As the mold blocks move to pipe-clamping postion, the limit switch LS4 is tripped by the arm 18a, which initiates operation of the timer TD (FIG. 3) and also actuates the solenoid valve 26b to commence forward travel of the mandrel 28.

The mandrel moves forwardly and picks up the stripper plate 34 as described above. As the mandrel and stripper plate continue forward movement, the mandrel enters the end 42 of the pipe and forms the bell. Mandrel travel is stopped when the end 42 of the pipe contacts the switch finger 38, producing a signal via the photoswitch 63 to terminate forward travel of the mandrel by actuating solenoid valve 26a. The solenoid valve 22 is also turned on at this time, applying cooling water to the pipe through the nozzles 20a and 20b for the remaining time of the cycle timer.

At the end of the belling time cycle, the water jet solenoid valve 22 is closed and the solenoid valve 26b is reversed to retract the mandrel 28. If the belled pipe sticks to the mandrel, the pipe will slip in the mold blocks 14a, 14b and will travel backward with the mandrel and the stripper plate 34 until the stripper plate contacts the mounting plate 30. At that point, the mandrel continues moving back but the belled pipe 43 is stripped from the mandrel by the now-stationary stripper plate 34. The switch finger 38 remains in its recess 44 at this time, thereby protecting the switch finger from damage by the contacting force of the belled pipe. When fully retracted, the mandrel 28 trips the limit switch LS1 which activates the solenoid valve 66b to open the mold blocks 14a, 14b. As the mold blocks begin to open, limit switch LS4 is disengaged, causing the solenoid valve 26a to shift and relieve return force from the cylinder 25. When the mold blocks are fully opened, the limit switch LS2 is tripped to initiate pipe handling apparatus (not shown) which indexes the belled pipe out of the throat 12 and indexes a fresh piece of pipe in for the next belling operation.

If for some reason the pipe end 42 is not contacted as the mandrel carries the stripper plate forwardly, the mandrel and stripper plate either stall from lack of force or go to the full stroke of cylinder 25 and stop. As the timer times out, the mandrel and stripper plate retract; an alarm condition is set by the absence of a signal from the photoswitch 63 during the belling cycle, indicating that a "bad bell" has been made. The next piece of pipe is indexed in, as described above.

If a piece of pipe is not present between the mold blocks 14a and 14b as the mandrel and stripper plate travel forward, the mandrel and stripper plate simply travel until the end of stroke for cylinder 25 is reached. When the timer times out, the mandrel and stripper plate retract, the mold blocks open, and the next piece of pipe is indexed in.

Turning next to FIG. 3, details and the function of the electrical control circuit associated with the present apparatus are described. It should be understood by those skilled in the art that FIG. 3 includes only those circuit elements directly concerned with the operation of the disclosed belling apparatus, and that the electrical circuit of a complete pipe belling machine may also incorporate additional control circuits for related components not disclosed in detail.

FIG. 3 includes a normally-open momentary switch 68 which initiates the automatic operation of the belling sequence by energizing the coil of control relay CR1, controlling a number of similarly-designated electrical contacts throughout the circuit of FIG. 3. One of these contacts CR1, shown at 69, becomes closed to shunt the momentary switch 68 and maintain the control relay CR1 energized until the momentary normally-closed stop switch 70 is operated. The contact 71 of control relay CR1 is also closed by energizing the control relay CR1, completing a circuit through normally-closed contact CR4 to the operating solenoid 66a to close the clamping cylinders 13a, 13b associated with the pipe-clamping mold blocks.

As the arm 18 associated with clamping cylinder 13a moves forward from the full-back position, the normally-closed limit switch LS2 becomes closed to activate the control relay CR3 for a purpose described below.

When normally-open limit switch LS4 is tripped by the fully-closed mold blocks, the circuit 75 is completed to activate the control relay CR4, and also to initiate the operation of the timer TD. The control relay CR4 now opens the normally-closed contact 72 to deenergize the solenoid valve 66a, and the timer TD initiates a predetermined time interval the conclusion of which closes the normally-open contact 73 in the circuit 74, both described below.

The now-closed limit switch LS4 also completes the circuit 77 through the normally-closed contact 78 of control relay CR7 and the now-closed contact 79 of control relay CR1 to energize the solenoid valve 26b, commencing forward travel of the mandrel 28.

The photoswitch 63, actuated by the switch finger on the stripper plate, is represented in FIG. 3 by the normally-open contact 63, although it will be understood that the photoswitch sensor in practice is connected to a suitable photoswitch control which provides the normally-open switching function while the photoswitch sensor receives no illumination. When the switch finger 38 (FIG. 2) contacts the end of the pipe, the photoswitch 63 closes to complete the circuit 79 controlling the water jet solenoid valve 22. Cooling water is applied to the belled pipe at this time, and the "water on" indicator light 80 becomes illuminated. Control relay CR6 also is energized at this time, closing the contact 81 to maintain the cooling water control circuit 79 after the photoswitch 63 subsequently becomes open. The control relay CR6 also closes the contact 82 to establish the circuit 84 energizing control relay CR5. Contact 83 now closes to shunt the contact 82 and maintain the circuit 84.

Closure of the photoswitch 63 also completes the circuit 85 to the solenoid valve 26a, applying air pressure to both sides of the mandrel cylinder 25 and thereby holding the mandrel at its extended position for the belling operation.

When the timer TD times out to close the contact 73 and establish circuit 74, control relay CR7 becomes energized to open the normally-closed contact 78 in circuit 77, thus de-energizing the solenoid valve 26b for the mandrel actuating cylinder. The solenoid valve 26a remains actuated through the circuit 85 at this time, the holding contact 86 now being closed by CR7 to shunt the photoswitch 63, and so the cylinder 25 begins retracting the mandrel. Control relay CR7 also opens the normally-closed contact 87 in circuit 79, breaking the circuit to the cooling water solenoid valve 22 and cutting off the flow of water. The control relay CR5 remains energized at this time through the contact 83, although contact 82 was opened when the control relay CR6 was de-energized by opening contact 87.

The mandrel continues retracting as described above until the mandrel trips the normally-closed limit switch LS1, breaking the circuit to control relay CR2 and thus closing the contact 89 in circuit 90 leading to the solenoid valve 66b which opens the clamping cylinders 13a and 13b. When the clamping cylinders are opened, the normally-closed limit switch LS2 breaks the circuit to control relay CR3, thus providing a control signal for apparatus (not shown) to remove the just-belled pipe and load a new pipe, or to signal the end of the belling operation.

If for some reason the end of the pipe did not contact the switch finger 38 during the belling operation, the photoswitch 63 remains open as the time delay TD eventually times out. Neither the cooling water solenoid valve 22 nor the control relays CR6 and CR5 are energized, because circuit 79 remains open due to the open photoswitch 63. As the time-delay contact 73 closes and energizes control relay CR8, circuit 91 is completed through the normally-closed contact 92 of de-energized control relay CR5; contact 93 is closed at this time because the normally-closed limit switch LS1 energizes the control relay CR2. A circuit is thus completed to the "bad bell" alarm 94, which can include a flashing light, an audible signal, and the like. The control relay CR9 is also energized through circuit 91, closing the contact 95 in holding circuit 96 to maintain the bad-bell alarm 94 in operation as the circuit 91 becomes broken when the contact 93 is opened as limit switch LS1 de-energizes control relay CR2. The alarm 94 continues to operate until the holding circuit 96 is broken by operating the momentary normally-closed reset switch 97, thus breaking the holding current circuit through the control relay CR9.

It should be understood that the foregoing relates only to a preferred embodiment of the present invention, and that numerous changes and modifications may be made therein without departing from the spirit and scope of the invention as described in the following claims.

What is claimed is:

1. In a pipe belling apparatus including mandrel means operable to enter an end of a pipe so as to form a belled socket at the pipe end, the improvement comprising in combination:
   means operative to effect relative closing movement between said mandrel means and said pipe end;
   first means disposed to be engaged by said mandrel means and moved therewith toward said pipe end;
   said first means including sensing means operative to provide a signal in response to sensing said pipe end when said mandrel has entered a predetermined distance into said pipe end; and
   means responsive to said signal to discontinue said closing movement.

2. The improvement as in claim 1, wherein:
   said first means comprises a member movable with said mandrel means to engage said pipe end only when said mandrel means is said predetermined distance into said pipe; and
   said sensing means includes a switch member associated with said movable member to provide said signal when said member engages the pipe end.

3. The improvement as in claim 1, wherein:
   said first means is separate from said mandrel means and is operative to be engaged by said mandrel means in the course of said closing movement and thereafter carried toward said pipe end with the mandrel means.

4. The improvement as in claim 3, wherein:
   said movement means is selectably operative either for said closing movement, or for relative opening movement separating said mandrel means relative to said pipe end; and further comprising
   stop means positioned to prevent opening movement of said first means beyond a certain point as said mandrel means undergoes further opening movement beyond said certain point, so that said mandrel means can withdraw from said first means as the mandrel means undergo further opening movement beyond said certain point.

5. Apparatus as in claim 4, wherein:
   said first means is operative to engage said pipe end only when said mandrel means has entered said predetermined distance into said pipe; and
   said first means prevents movement of said pipe by said mandrel means as the mandrel means moves open beyond the point where said first means engages said stop means, so that the pipe is stripped from the mandrel means by said further opening movement.

6. Apparatus for forming a belled shape on an end of a pipe, comprising:
   mandrel means movable along a path so as selectably either to advance toward or retract from the pipe end;
   stripper means located on said path between said mandrel means and the pipe end;
   said stripper means comprising a stripper member selectably engagable for movement with said mandrel means advancing toward the pipe end, and a stop member to limit the retraction of said stripper member as said mandrel means retracts from the pipe end, so that said mandrel means can disengage said stripper member and thereafter retract further along said path; and
   sensing means associated with said stripper member to provide a signal when said mandrel means reaches a predetermined depth within the pipe end during advance movement.

7. Apparatus as in claim 6, wherein:
   said stripper member has an opening through which said mandrel means enters and protrudes as the mandrel means engages said stripper member and advances beyond said stop member; and
   said sensing means comprises a contact member carried by said stripper member adjacent said opening so as to engage said pipe end when said mandrel means reaches said predetermined depth within the pipe, so as to provide said signal.

8. Apparatus as in claim 7, wherein:
   said stripper member has a front side contacting said pipe end, and a back side;
   said contact member is on the front side of said stripper member; and further comprising
   switch means carried by said stripper member in spaced apart relation to said back side, for movement with the stripper member; and
   means operatively associating said switch means with said contact member, so that the switch means is actuated when the contact member engages the pipe end.

9. Apparatus as in claim 8, wherein:
   said switch means comprises a light source and a photoswitch mounted in alignment along an optical path; and
   a switch member normally blocking said optical path and operatively coupled to said switch operating means, so that the switch member unblock the optical path and said photoswitch provides said signal in response to the contact member engaging the pipe end.

10. Apparatus as in claim 6, further comprising alarm means responsive to said sensing means to produce an alarm condition when the sensing means fails to contact a pipe end upon advancing movement of said mandrel means.

11. Apparatus as in claim 6, further comprising:
clamp means selectably operative to clamp a pipe in predetermined relation to the path of said mandrel means;
means responsive to clamping operation of said clamp means to initiate said advancing movement of said mandrel means, and to initiate an interval of time;
means operative to initiate said retracting movement of said mandrel means in response to the end of said time interval; and
alarm means responsive to said sensing means to produce an alarm signal if the sensing means fails to contact the pipe end by the end of said time interval.

* * * * *